Nov. 24, 1970 L. POVLACS ET AL 3,541,609
GLOVE
Filed Oct. 9, 1968 2 Sheets-Sheet 1
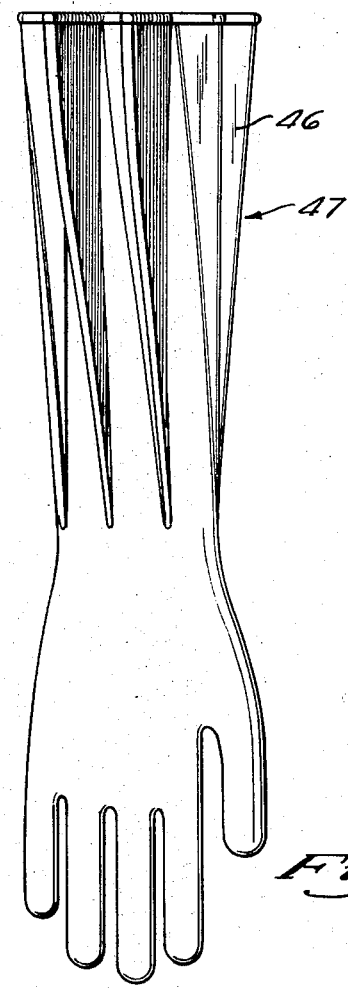
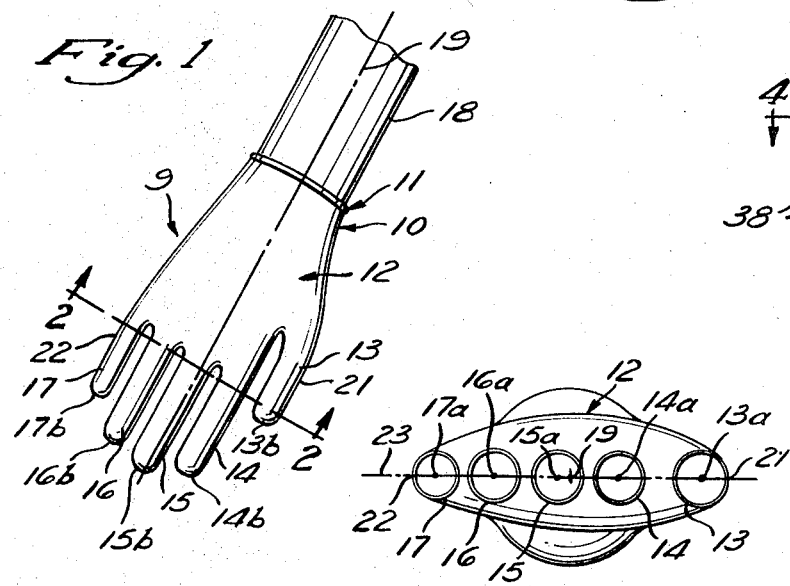
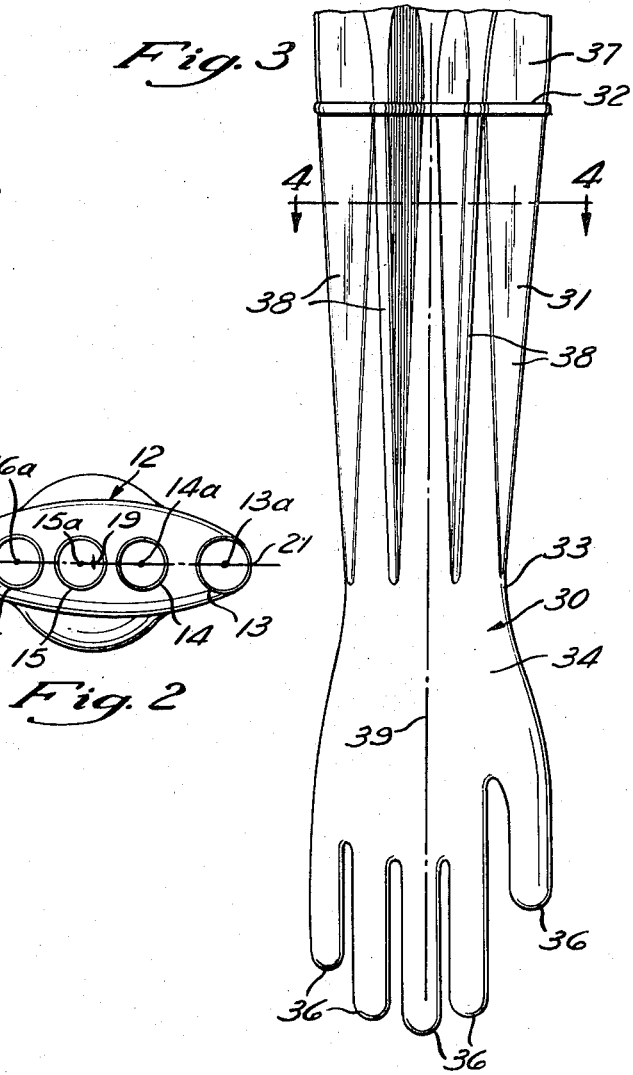
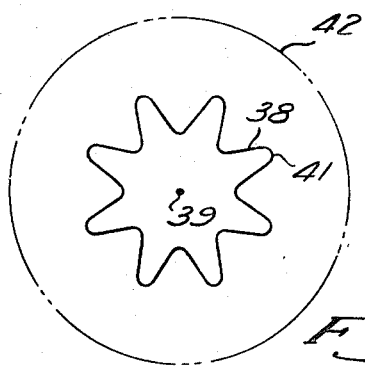
INVENTORS
LAWRENCE POVLACS,
& RICHARDSON W. HOWE
BY
M<sup>c</sup>NENNY, FARRINGTON, PEARNE & GORDON
ATTORNEYS

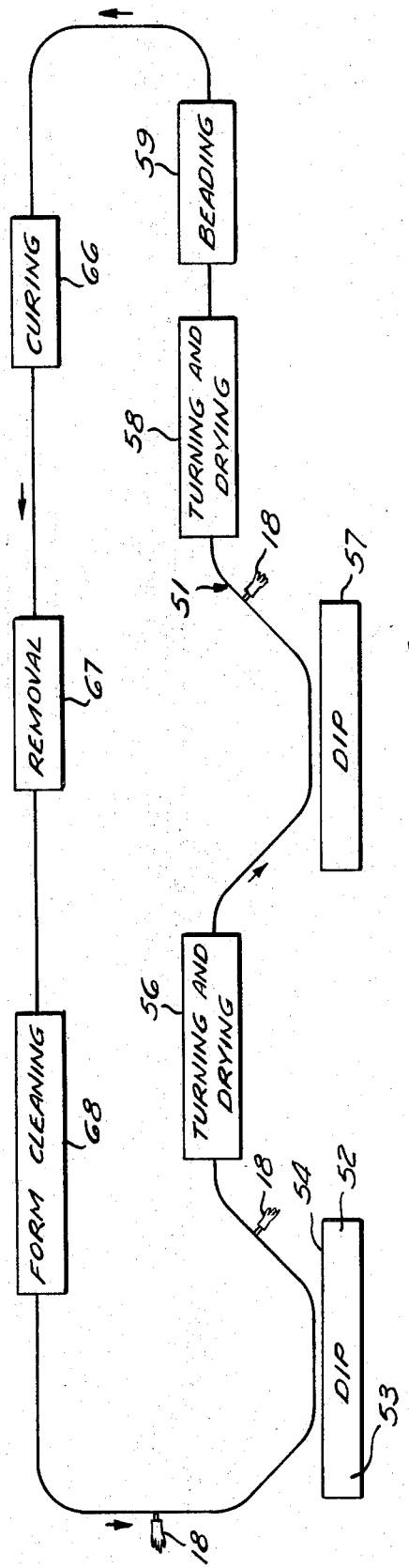
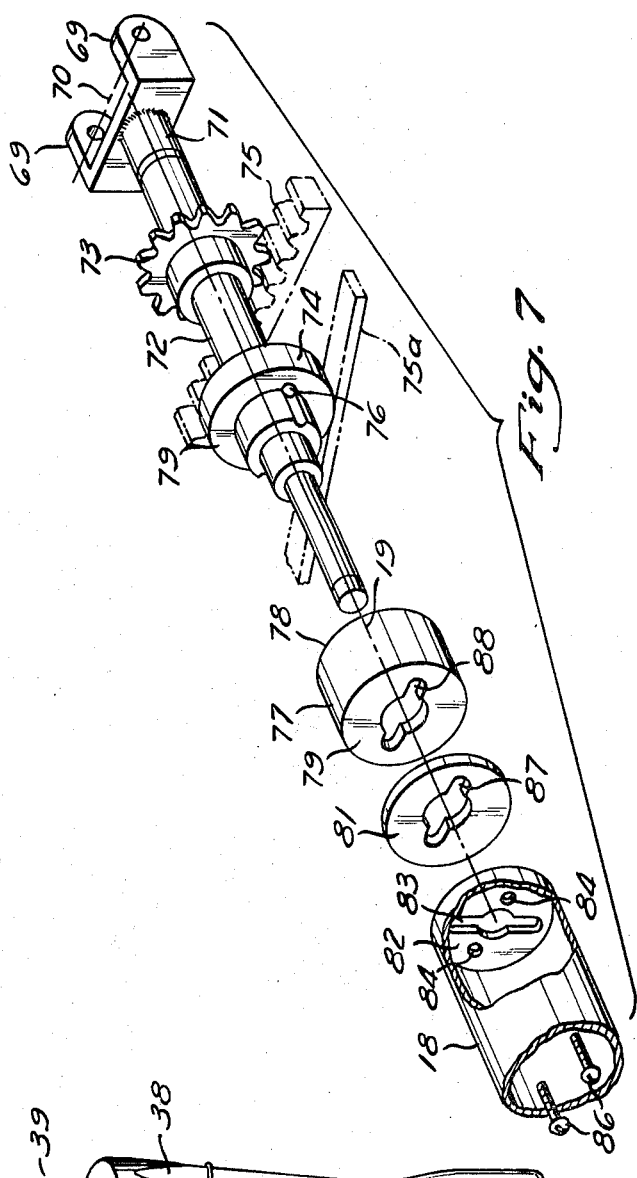
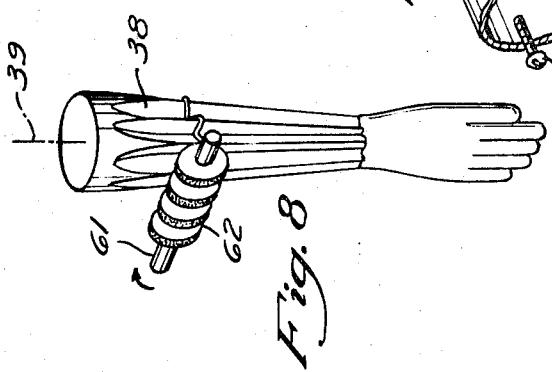

United States Patent Office 3,541,609
Patented Nov. 24, 1970

3,541,609
GLOVE
Lawrence Povlacs, Dothan, Ala., and Richardson W. Howe, Cuyahoga Falls, Ohio, assignors to Ackwell Industries, Incorporated, Dothan, Ala., a corporation of Ohio
Filed Oct. 9, 1968, Ser. No. 766,246
Int. Cl. A41d 19/00
U.S. Cl. 2—168        10 Claims

ABSTRACT OF THE DISCLOSURE

A disposable rubber glove is disclosed which is formed of latex or the like having a wall thickness in the order of 0.003 to 0.005 inch. The glove shape is neuter, but the material is sufficiently elastic to permit it to stretch to fit either hand. When unstressed, the glove is proportioned so that a central axis bisects the lateral width of the glove and the fingers are parallel to the central axis. Fluted arm portions provide increased wall length without requiring large diameter mold forms. The machine for forming the glove includes a continuous conveyor which carries the forms through two dipping operations with intermediate drying of the coatings, a beading operation, a curing operation, and a stripping operation.

BACKGROUND OF INVENTION

This invention relates generally to protective gloves and more particularly to a novel and improved disposable rubber glove and to a novel and improved method and apparatus for the manufacture of such gloves.

PRIOR ART

In the past it has been customary to form rubber or plastic gloves by dip or spray coating a form with the glove material. Usually such method has been performed by batch processing. However, in some instances continuous processing has been used. The patents to Abildgaard 3,094,704 and 3,117,341 describe the manufacture of plastic gloves by such continuous processing. In the past such gloves have been sufficiently expensive to preclude their general use as disposable gloves which may be discarded after a single use.

In order to reduce cost to a point where it is generally practical to discard the gloves after a single use, it has been proposed to form gloves from two thin plastic sheets sealed together around their edges. Examples of such gloves are described in the Pats. 3,178,725, 3,191,187, and 3,235,881. Such plastic gloves, however, are unsatisfactory for general use since they are relatively fragile and since material forming the glove is relatively nonelastic. Consequently such gloves, which are not molded to the shape of the hand, have normally been made large and have been clumsy to use.

SUMMARY OF INVENTION

The present invention is directed to a glove, of sufficient high quality to permit its use even by surgeons, which is sufficiently inexpensive to permit its general use as a disposable glove which may be discarded after a single use. It has been found, however, that a glove in accordance with the preferred forms of this invention, even though very inexpensive, may often be satisfactorily used several times.

A glove in accordance with the preferred form of this invention is a neuter glove, in that the same glove shape is used for both hands. The glove is formed of very thin, very elastic latex rubber or the like and has a wall thickness less than about 0.007 inch and which is preferably in the order of about 0.003 inch to 0.005 inch. Because the glove is formed of a very thin, very elastic material, it easily stretches to smoothly fit the user's hand and does not provide sufficient pressure on the hand to cause the user discomfort, even after relatively long periods of use. The high elasticity of the glove further permits the use of at most two glove sizes to properly fit all of the hand sizes normally encountered. The material is sufficiently tough and durable so that it is not easily damaged in use. Preferably the material at the ends if the fingers is slightly thicker to increase the resistance to damage in the area of high stress and wear at tht fingertips. Because the glove is very thin, even in the area of the fingertips, the user's sense of "feel" is not materially decreased and the glove is ideal for use where a delicate sense of "feel" is required.

The shape of the glove is arranged to permit economical manufacture while maintaining high quality. For example, the neuter glove shape drastically reduces manufacturing and packaging costs since it is not necessary to manufacture two different mating gloves and then insure that the proper pairs are packaged together. The mold finger portions are all parallel so that when the coated mold may be tipped and turned to provide a uniform coating thickness, such tipping and turning is equally effective on all fingers.

The preferred method and apparatus in accordance with this invention provides continuous processing. A continuous conveyor is provided with a plurality of molds which are sequentially carried by the conveyor through the various operations required for the manufacture of the glove. Since tipping and turning of the molds is provided to produce a uniform coating thickness, the mounting of the forms on the conveyor must be arranged so that the molds can be turned without interference with the adjacent molds. Also since the rate of production of a given machine is a function of the speed of the conveyor and the spacing of the molds, higher production is achieved for a given conveyor speed when the molds are closely spaced along the conveyor. Therefore, in accordance with the present invention, the molds are formed and mounted so that the central axis about which the molds rotate bisects the lateral width of each mold. Such an arrangement permits a minimum spacing between molds without interference.

In two illustrated embodiments a glove and a method and apparatus for forming such gloves are arranged so that the glove is sufficiently long to fit along the user's arm to or above the elbow. The arm portions of such gloves are provided with axially extending flutes so that the portion of the mold forming the arm section provides increased wall length in planes perpendicular to the central axis of the glove without requiring a large diameter mold. With such an arrangement the small spacing between the forms can be maintained even though a relatively large diameter arm portion is provided. Since the manufacture in accordance with the preferred method and apparatus of this invention is completely automated, the labor costs of manufacture are virtually eliminated. Because the machine provides a high production rate due to its continuous processing, the cost of manufacture of the gloves closely approaches the cost of the material of the glove itself. The thin wall thickness of the glove, therefore, materially reduces the total cost of manufacture since very little material is required for each glove.

Preferred embodiments are illstrated in the drawings wherein:

FIG. 1 is a perspective view of a glove mold with the glove thereon in accordance with the first embodiment of this invention;

FIG. 2 is a cross section taken generally along 2—2 of FIG. 1;

FIG. 3 is a side elevation of a second embodiment of glove and mold wherein the glove extends up from the wrist portion to provide an arm portion having axially extending flutes;

FIG. 4 is a cross section taken generally along 4—4 of FIG. 3 illustrating the fluted shape in full line and illustrating in phantom the size to which the flutted section may be extended without substantially elastic deformation;

FIG. 5 is a side elevation of a third embodiment of glove wherein the fluting is formed in a spiral shape;

FIG. 6 is a schematic illustration of the processing operations for manufacturing gloves in accordance with this invention;

FIG. 7 is an exploded perspective view illustrating a structure of mounting the form on the conveyor; and, FIG. 8 is a schematic illustration of one method and apparatus for forming the bead on the fluted gloves.

Referring now to FIGS. 1 and 2, a glove 9 in accordance with the first illustrated embodiment of this invention is provided with an arm or wrist portion 10 providing a circular open end through which the user's hand is inserted. A rolled bead 11 extends around the open end. Extending from the wrist portion 10 is the hand portion 12 which is adapted to enclose the hand proper. Five finger portions 13 through 17 extend from the hand portion and are adapted to receive the user's five fingers. In FIG. 1 the glove is illustrated while it is still on a mold 18. The mold 18 and, in turn, the glove are arranged so that a central axis 19 perpendicular to the plane of the beaded open end 11 extends midway from the radial extremities 21 and 22 of the finger portions 13 and 17, respectively. Therefore, the central axis 19 bisects the maximum lateral width of the glove and the form.

Each of the finger portions 13 through 17 is substantially cylindrical about a respective finger portion axis 13a through 17a and is closed at its extremity to provide tip portions 13b through 17b. As illustrated in the drawings the finger portion 13 which is adapted to receive the user's thumb includes a first portion which is inclined laterally from the hand receiving part and a second portion which extends parallel to the central axis 19. It is preferable to taper the finger portions slightly toward their ends. This improves the finger fit and makes it easier to strip the glove from the mold. The axes 13a through 17a of the finger portions are substantially parallel to the central axis 19 and are all contained within a plane 23 which also contains the central axis 19. Further the hand portion 12 and the wrist portion 10 are preferably symmetrical with respect to the central plane 23. The glove formed by the mold 18 is a "neuter" type glove which is not intended to conform, in its unstressed condition, to the shape of either the user's right or left hand. However, since the glove is formed of a very thin, very elastic material, as discussed in more detail later, the glove can be comfortably stretched to the shape of the hand so that it smoothly fits either the user's right or left hand. It is preferably to size the glove so that substantially all portions of the glove are stretched slightly when on the user's hand. With such sizing the glove smoothly fits the hand with substantially no wrinkling or looseness. With the illustrated glove shape the various portions of the glove tend to approximate the size and shape of the hand and the amount of stretching required to provide a good, smooth fit is relatively uniform. Therefore, excessive tightness does not occur in any particular area.

The glove is preferably formed by dipping the mold 18 in the manner described in detail below to form a coating of latex rubber or the like having a substantially uniform thickness of less than about 0.007 and preferably in the order of about 0.003 to 0.005 inch. The tip portions 13b through 17b, however, are preferably about 0.001 inch thicker than the remaining portions of the glove. Therefore, a glove which has an overall thickness of 0.003 inch will have a fingertip thickness of about 0.004 inch.

Referrng to FIGS. 3 and 4, a second embodiment of this invention is illustrated wherein the glove is provided with an elongated arm portion adapted to extend up along the user's arm either to or beyond the elbow. In FIG. 3 the glove 30 includes an arm portion 31 extended from a beaded end at 32 to the wrist portion at 33. The shape of the hand portion 34 and finger portions 36 is the same as the shape of the glove illustrated in FIGS. 1 and 2. The difference lies only in that the glove is provided with an arm portion 31. In order to minimize the radial extent of the mold 37 required to form the glove 30, the arm portion is formed with axially extending flutes 38 which taper from the upper end of the arm portion downwardly toward the lower end with a maximum flute depth at the upper end and a zero flute depth at the junction with the wrist portion.

The arm portion of a glove, particularly when it is intended for use by men such as surgeons or men in industrial plants, must be relatively large in diameter in order to properly fit over the arm. Preferably the arm portion is sized so that it does not require any substantial amount of stretching to properly fit the arm since "feel" in this zone is relatively unimportant and since the shape of the arm is not irregular like the hand. The fluting is provided to increase the length of the wall in the area of the arm portion without increasing the maximum radial extent of the mold 37 from the central axis 39. As is illustrated in FIG. 4, the fluting 38 is preferably symmetrically arranged around the mold. In the illustrated form there are eight flutes symmetrically positioned around the central axis 39. In one embodiment the maximum radius of the extremities of the fluting 41 is one and three-eights (1⅜) inches, but because of the fluting the length of the wall in a plane perpendicular to the central axis is equivalent to a circle having a radius of two and one-half (2½) inches when the wall is extended to a circular shape as indicated by the phantom circle 42.

The fluted glove, as illustrated in FIG. 3, is also desirable in many instances, since it permits the glove to be folded back on itself to form a cuff. Such a cuff is useful since it tends to prevent liquids from running up the arm by catching the liquid when the arm is tipped up and allowing it to drain downwardly when the arm is tipped down. The irregular form of the flutes tends to maintain a space between the folded back cuff and the adjacent portion of the glove so the fluted shape facilitates the proper functioning of the cuff.

Referring to FIG. 5, still another embodiment of a glove incorporating this invention is illustrated. The glove of FIG. 5 is similar to the glove of FIG. 3, but the fluting 46 is formed as a spiral extending axially along the arm portion 47. In other respects the glove of FIG. 5 is identical to the glove of FIG. 3 and has a wrist, hand, and finger structure similar to the embodiments of FIGS. 1 and 2.

FIG. 6 illustrates a preferred apparatus for manufacturing gloves in accordance with this invention. This apparatus includes a continuous power-driven conveyor 51 with a plurality of glove forms such as the glove form 18 mounted thereon. Only randomly located glove forms are illustrated to simplify the drawings. However, in practice the glove forms are spaced along the conveyor 51 as close as possible. For example, if the maximum lateral width of the glove form is two and three-quarter (2¾) inches, the glove forms are mounted along the conveyor at about three-inch centers.

The glove forms are supported on the conveyor for tipping movement from a downward vertical position all the way up to an upward vertical position by a structure described in more detail below. The glove forms are also supported on the conveyor for rotary movement in respect to the conveyor about the central axis 19. Guides are provided to cause the desired tipping and turning movement in response to conveyor movement.

Each of the glove forms 18 is sequentially carried through a cycle of operation which will now be described. At the beginning of the operation the glove form 18 is carried by the conveyor 51 downwardly into a first bath 52 which is filled with liquid latex or the like in the uncured state. The conveyor 51 causes the glove form to be dipped and coated as the glove form is carried along the bath 52 from an entry end 53 to an exit end 54. The form hangs down vertically during the dipping operation and is turned about its central axis 19 to insure that the coating liquid completely coats the form to the desired height. The conveyor raises the form up as it is removed from the bath 52. The form remains over the bath for a limited travel after it has been raised out of the bath so that excess material which drips off of the form is returned to the bath.

The glove forms are then carried through a turning and drying section 56 in which the coating from the bath 52 is dried while the form is rotated about its central axis 19 and tipped with respect to the vertical to cause the coating to flow and evenly distribute itself along the form. The arrangement of the finger portions 13 through 17 so that they extend substantially parallel to the central axis 19 facilitates the even distribution of the coating since the tipping and turning is equally effective on each of the finger portions. The rate of turning movement is relatively slow so centrifugal force does not become a factor and the flow distribution of the coating is primarily the result of gravity. If it is found that the thickness of the coating near the wrist is less than desired, the guide tracks should be rearranged to tip the glove form up above horizontal to a greater degree. If the thickness of the glove coating in the area of the fingers is less than at the wrist portion, the tipping should be rearranged so that the glove is downward more and the flow will be more toward the fingers. A particular path of tipping required to produce even distribution varies somewhat with the coating material. However, those skilled in the art will find very little difficulty in establishing proper coating uniformity by adjusting the movement of the glove form to fit the requirement of the particular fluid used for the coating. During the movement through the turning and drying station 56, warm air may be blown on the coating so that it is partially dried to a substantially nonfluid condition.

After leaving the first coating station 52 and the first drying station 56, the conveyor 51 is arranged to dip the form a second time in a dipping bath 57 in a manner similar to the dipping at the first bath 52. This provides a second coating on the form. From the second bath 57, the form is carried through a second turning and drying station at 58 where the form is again turned and tipped to produce a uniform distribution of the coating material and to dry the coating until it is substantially nonfluid. It should be recognized that the drying in the two drying stations 56 and 58 is not intended to provide complete curing of the coating since further operations are required before curing is desired and since the two coatings should be such that they form a single homogeneous glove wall.

After leaving the second drying and turning station 58, the glove forms are carried to a beading station 59. At the beading station 59, the coating adjacent to the open end of the glove, which in the case of the embodiment of FIG. 1 is at the wrist portion and which in the case of the embodiments of FIGS. 3 and 5 is at the top of the arm portion, is engaged by a rotating brush which rolls up a bead at the upper edge of the glove. This bead strengthens the glove and improves its resistance to tearing when the glove is put on or taken off the user's hand. The bead also insures that the open edge of the glove is not ragged or thin.

When a fluted form of the type illustrated in FIGS. 3 and 5 is used, a brush of the type illustrated in FIG. 8 is also used. This brush is mounted for rotation upon support shafts 61 and is provided with a helical or spiral projection 62 along its periphery which is shaped to mate with the adjacent tooth-shaped form of the fluting. The brush is rotated about the axis 61 while the form rotates about its central axis 39 so that the brush uniformly engages all of the surfaces of the form. The operation of the brush is similar to a worm gear drive.

The axis of the brush is positioned with respect to the axis 39 and the helix angle of the projection 62 so that the movement along the contact zone between the brush and the form is substantially parallel to the axis 39. In some instances it is desirable to provide a synchronized drive for rotating the form in timed relationship with the brush. However, if sufficient rigidity is provided in the brush bristles and if the form support is arranged so that the form can turn with sufficient ease, the rotation of the form can be accomplished by the engagement between the brush and the form. It should be understood that as the brushing occurs, the form is carried by the conveyor in a direction substantially parallel to the axis of the shaft 61.

After the bead is formed, the conveyor 51 carries the forms through a curing station at 66. At this station sufficient heat is applied to cure the coating. The conveyor then carries the form through an automatic stripping station 67 where the glove is stripped from the form. The stripping can be accomplished by the use of water jets, air jets, brushes or any other suitable means. From the stripping station 67 the forms are carried through a cleaning station 68 wherein the forms are cleaned and dried for a repeated cycle. Preferably the forms are provided with a smooth finish so that the thin glove will have a smooth finish and will not be difficult to strip from the form at the completion of its manufacture. Hollow ceramic forms provided with a very smooth glaze have been found to be satisfactory. However, they may be formed of glass or, if desired, from highly polished metal.

FIG. 7 illustrates one mounting structure for supporting a form on the conveyor. This mounting structure includes a spindle member 71 provided with spaced projections 69 at one end which are adapted to be connected to the conveyor for pivotal movement about an axis 70 which is parallel to the direction of conveyor movement. This pivot mounting permits the tipping movement mentioned previously. Journaled on the spindle 71 for rotation about the axis 19 is a support tube 72. A gear 73 is mounted on the support tube 72 for engagement with toothed guides, represented in phantom by 75, appropriately positioned along the conveyor to cause rotation of the support tube. A form support collar 74 is provided on the support tube 72. The tooth guides provide a positive drive for rotating the forms even when they are hanging vertically. Normally when the forms are to be tipped up from the vertical or lowered back to the vertical, smooth nontoothed guides 75a are positioned to engage the collar and cause the desired tipping movement. These smooth guides normally provide sufficient friction against the collar 74 to rotate the form and are used for this purpose because of their lower cost when a nonpositive rotation drive is sufficient. With this structure, the tipping and rotating of the forms are produced by conveyor movement without separate power means.

The collar 74 is provided with opposed bolt holes 76 proportioned to receive the mounting bolts which secure the form 18 to the collar. A cup-shaped member 77 provides an open end 78 which seats against the face 79 of the collar 74 and provides a mounting face 79 which is substantially normal to the axis of 19. A rubber washer 81 fits against the face 79 and against the end wall 82 of form 18. The end wall 82 is provided with a central lateral slot 83 and two side bolt holes 84. The slot provides access to permit insertion of the bolts 86 into the bolt holes 84 with the heads on the inside. The elements are then assembled with the bolts extending through the bolt opening 87 in the rubber ring 81, the opening 88 in the cup-shaped member 77, and the bolt holes 76 in the collar 74. Nuts (not illustrated) are then threaded onto the bolts on the side of the collar 74 remote from the form 18 to secure the form in position. In this way the forms are removably mounted on the conveyor for rotation about the axis 19 and for tipping movement with respect to the conveyor about the axis 73.

The amount of material required to form the glove is small so the material expense of manufacture in low. In accordance with the method and apparatus for forming the glove, the labor expense of manufacture is virtually eliminated by completely automating the manufacture. Further the production rate of the preferred machine is such that the cost per unit of manufacture closely approaches the cost of the material alone so the fact that the glove is thin and does not require much material further decreases the cost of manufacture and makes it feasible to use the gloves as a disposable glove. Also the use of a single neuter glove for both hands drastically reduces the cost of manufacture as well as the cost of packaging and marketing since it is not necessary to separately handle and pair the gloves.

Although preferred embodiments of this invention are illustrated, it is to be understood that various modifications and rearrangements may be restorted to without departing from the scope of the invention.

What is claimed is:

1. An elastic rubber-like glove for hands having a predetermined size range comprising an open end through which a hand may be inserted, said open end lying substantially in a plane transverse to a central axis, a hand receiving part joined to said end, four finger portions and a thumb portion extending from said hand receiving part, said finger portions extending substantially parallel to said central axis with the axis of each portion lying substantially in a second plane containing said central axis, said thumb portion including a first part inclined laterally from the hand receiving part and the second part extending substantially parallel to said central axis with its axis lying substantially in said second plane, said central axis substantially bisecting the lateral extremities of said portions, said hand part being substantially symmetrical with respect to said second plane, said glove being sized when unstressed so that substantially all of its dimensions are less than the corresponding dimensions of a user's hand, fingers, and thumb, within said predetermined size range, and said glove being formed of an elastomeric material which stretches in substantially all of its dimensions when worn by such user having a hand within said predetermined size range and smoothly fits either his right or left hand without sufficient pressure to materially restrict user movement or to cause substantial user discomfort.

2. An elastomeric rubber-like glove as set forth in claim 1 wherein said open end lies in a plane perpendicular to said central axis.

3. An elastic glove as set forth in claim 1 wherein a rolled bead is provided at said open end of said wrist portion.

4. An elastic glove as set forth in claim 3 wherein said glove is formed of latex rubber having a wall thickness of between about 0.0025 inch and 0.006 inch.

5. An elastic glove as set forth in claim 4 wherein the tips of said finger portions are slightly thicker than the remainder of said finger portions.

6. An elastic glove as set forth in claim 5 wherein the thickness of said arm, hand, and finger portions is between approximately 0.003 inch and 0.005 inch, and the thickness of the tips of said finger portions is between approximately 0.004 inch and 0.006 inch.

7. An elastic rubber-like glove comprising an open end through which a hand may be inserted, said open end lying substantially in a plane transverse to a central axis, a hand receiving part joined to said end, four finger portions and a thumb portion extending from said hand receiving part, said finger portions and at least the end part of said thumb portion extending substantially parallel to said central axis with the axis of each portion lying substantially in a second plane containing said central axis, said central axis substantially bisecting the lateral extremities of said portions, said hand part being substantially symmetrical with respect to said second plane, said glove being sized when unstressed so that substantially all of its dimensions are less than the correponding dimensions of a user's hand, fingers, and thumb, said glove being formed of an elastomeric material which stretches in substantially all of its dimensions when worn by such user and smoothly fits either his right or left hand without sufficient pressure to materially restrict user movement or to cause substantial user discomfort, said glove being provided with an arm portion sufficiently long to extend substantially to a user's elbow, said arm portion when unstressed being formed with fluting symmetrical around said central axis having radial extremities spaced from said central axis a distance at least substantially as small as the maximum spacing between said finger portions and said central axis, said fluting providing a wall length at said open end which is substantially greater than the circumference of a circle having a radius equal to the maximum spacing between said central axis and said radial extremities of said fluting.

8. An elastic glove as set forth in claim 7 wherein there are at least eight flutes symmetrically positioned around said central axis.

9. An elastic glove as set forth in claim 7 wherein said fluting extends substantially parallel to said central axis.

10. An elastic glove as set forth in claim 8 wherein said fluting extends in a long spiral with respect to said central axis.

References Cited

UNITED STATES PATENTS

| 692,703   | 2/1902  | Pfeiffer      | 2—168   |
| 1,554,291 | 9/1925  | Peck          | 2—168   |
| 2,266,716 | 12/1941 | Robertson     | 2—168   |
| 3,059,241 | 10/1962 | O'Brien et al.| 2—167   |
| 3,197,786 | 8/1965  | Velonis et al.| 2—167   |
| 1,206,102 | 11/1916 | Gibson        | 2—168 X |
| 2,335,871 | 12/1943 | Milligan      | 2—168   |
| 2,683,263 | 7/1954  | Lenhart       | 2—168   |
| 3,110,035 | 11/1963 | LaHue         | 2—168   |
| 3,225,360 | 12/1965 | Keilen et al. | 2—167   |
| 3,255,492 | 6/1966  | Velonis et al.| 2—168 X |
| 3,268,647 | 8/1966  | Hayes et al.  | 2—168 X |

JORDAN FRANKLIN, Primary Examiner

G. V. LARKIN, Assistant Examiner